United States Patent
Lillejordet (10) Patent No.: US 12,117,103 B2
(45) Date of Patent: Oct. 15, 2024

(54) SUBSEA FLUID CONNECTION SYSTEM AND ASSOCIATED METHOD

(71) Applicant: Nautilus Subsea AS, Lysaker (NO)

(72) Inventor: Per Lillejordet, Bjørnemyr (NO)

(73) Assignee: Nautilus Subsea AS, Lysaker (NO)

( * ) Notice: Subject to any disclaimer, the term of this patent is extended or adjusted under 35 U.S.C. 154(b) by 180 days.

(21) Appl. No.: 17/774,620

(22) PCT Filed: Nov. 4, 2020

(86) PCT No.: PCT/NO2020/050270
§ 371 (c)(1),
(2) Date: May 5, 2022

(87) PCT Pub. No.: WO2021/101387
PCT Pub. Date: May 27, 2021

(65) Prior Publication Data
US 2022/0390038 A1    Dec. 8, 2022

(30) Foreign Application Priority Data
Nov. 22, 2019 (NO) .................... 20191396

(51) Int. Cl.
*F16L 1/26* (2006.01)
*E21B 43/01* (2006.01)
(52) U.S. Cl.
CPC ............ *F16L 1/26* (2013.01); *E21B 43/01* (2013.01)
(58) Field of Classification Search
CPC ....... F16L 1/26; E21B 43/0107; E21B 43/013
See application file for complete search history.

(56) References Cited

U.S. PATENT DOCUMENTS

| 7,503,727 B2 | 3/2009 | Ingebretsen et al. |
| 2003/0168857 A1 | 9/2003 | Jennings |
| 2012/0160505 A1 | 6/2012 | Lonnemo et al. |
| 2019/0055822 A1 | 2/2019 | Cargol, Jr. et al. |

FOREIGN PATENT DOCUMENTS

| EP | 2722479 A1 | 4/2014 | |
| GB | 2176559 A * | 12/1986 | ......... E21B 43/0135 |
| WO | WO-2008063080 A1 * | 5/2008 | ........... E21B 43/013 |
| WO | WO-2015197539 A1 | 12/2015 | |
| WO | WO-2018217099 A1 | 11/2018 | |

OTHER PUBLICATIONS

Eriksson, Magnus; International Search Report; PCT/NO2020/050270; dated Jan. 15, 2021; 3 pages.

* cited by examiner

*Primary Examiner* — Sunil Singh
(74) *Attorney, Agent, or Firm* — Bradley Arant Boult Cummings LLP (57) ABSTRACT

Method for connecting a termination hub (201a) to a porch hub (101a) at a subsea location by using a subsea fluid connection system (1). The connection system (1) comprises a porch part (100) with the porch hub (101a), a termination part (200) with the termination hub, and a connector (300). The method comprises a) landing the termination part (200) on the porch part (100) at a subsea location; b) moving the termination hub (201a) of the termination part (200) into alignment with the porch hub (101a) of the porch part (100); c) with the connector (300), connecting the termination hub (201a) to the porch hub (101a). The method further comprises d) after step c), actuating a moment arrestor arrangement (400), thereby further arresting the termination part (200) to the porch part (100). A subsea fluid connection system is also disclosed.

12 Claims, 9 Drawing Sheets

SUBSEA FLUID CONNECTION SYSTEM AND ASSOCIATED METHOD

TECHNICAL FIELD

The present invention relates to a subsea fluid connection system. Such systems are typically configured to connect to pipeline end terminations or to other fluid interfaces of a subsea facility.

BACKGROUND ART

In the prior art there are described a plurality of different solutions for connecting the termination head of a subsea pipeline to a tie-in structure. Typically, an end of a long steel pipeline is arranged in the vicinity of a subsea facility, such as a well template or a subsea processing facility. With the tie-in structure, fluid communication is provided between the pipeline and the facility in question.

An example of such a system from the prior art is disclosed in European patent publication EP2722479. Here, a termination part is landed onto a porch part on the seabed. During landing, the termination part is guided on a guidepost extending up from the porch part. Also, landing guiding means are arranged to ensure correct landing. The termination part and the porch part each comprises a hub that constitutes the end of a pipe. For connection of the two hubs, the termination part is equipped with a connector. The connector engages the two facing hubs, and clamps them together into a secure, sealed connection.

After landing, the termination hub is moved towards the porch hub with a horizontal movement. Typically, in the art, this movement is brought about by means of a stroke tool. In EP2722479, the stroke tool is an integrated part of the termination part. In other prior art solutions, a separate, removable stroke tool is common. During the horizontal movement, guiding means ensures that the two approaching hubs are aligned sufficiently for the connector to make up the final connection. This alignment involves aligning the mutual position as well as angular alignment.

Publication US20120160505 discloses another solution with a termination part that lands on a porch part, with a connector arranged to the termination part. Horizontally extending guiding means of the termination part and porch part, respectively, engage each other when the termination part is moved horizontally towards the connected mode. The guiding means create a force transferring structure to relieve forces from the connector.

Other solutions having guiding means based on the guide pin and guide bore principle are disclosed in U.S. Pat. No. 7,503,727 and WO2015197539.

Another solution, which departs from the guide pin and guide bore principle, is disclosed in WO2018217099. In this solution, guide arrangements with guide faces are arranged on the porch part. The guide faces are configured to slide against facing guide faces on the termination part when the termination part is horizontally moved towards the porch part. I the solution disclosed in WO2018217099, when the termination part has been moved within the capture range of the connector, which is then actuated, the guiding means are no longer active. That is, when the connector is actuated, loads are transferred through the connector and not the guide means.

Publication US2003168857 discloses a conventional method of interconnecting two facing hubs. In this solution, the two main structures, each carrying a respective hub to be connected, are first interconnected. After interconnection, the two facing hubs are moved towards each other and clamped together.

An object of the present invention may be to provide a method of connecting a termination hub to a porch hub at a subsea location by using a subsea fluid connection system, such that the made connection can withstand larger forces from a spool connected to the termination hub. A further object may be to provide a subsea fluid connection system that is configured to absorb large loads from the spool without exhibiting excessive size or weight.

Other objects may also be met with the method and apparatus according to the invention.

SUMMARY OF INVENTION

According to the present invention, there is provided a method for connecting a termination hub to a porch hub at a subsea location by using a subsea fluid connection system. The connection system comprises a porch part with the porch hub, a termination part with the termination hub, and a connector. The method comprises the following steps:
  a) landing the termination part on the porch part at a subsea location;
  b) moving the termination hub of the termination part into alignment with the porch hub of the porch part;
  c) with the connector, connecting the termination hub to the porch hub;
  d) after step c), actuating a moment arrestor arrangement, thereby further arresting the termination part to the porch part.

During step b) above, an alignment system comes into use during the said movement. Typically, the alignment system is in function only during the movement, and not during step c). Instead, during step c), the alignment system will typically not exert any guiding force between the porch part and the termination part. This enables the operator to actuate the connector without any interfering force from the alignment system. Consequently, for such embodiments, any bending force originating from a pipe, to which the termination hub is attached, will be transmitted through the connector (and the facing hubs). After step d), however, such bending forces will also be transmitted through the moment arrestor arrangement, reducing the forces transmitted through the connector. The pipe, to which the termination hub is connected, can typically be a tie-in spool.

With reference to the steps a), b), c) and d) above, the subsea fluid connection system can be said to be successively put into a landed state (step a), a moved state (step b), a connected state (step c), and an arrested state (step d).

The movement taking place in step b) can typically be a horizontal movement.

In an advantageous embodiment, the moment arrestor arrangement can comprise a termination arrestor interface, which is a part of the termination part, and a porch arrestor interface, which is a part of the porch part. In such embodiments, step d) can comprise
  i) closing an arrestor gap between the termination arrestor interface and the porch arrestor interface by actuating an arrestor element.

With the term "closing an arrestor gap" is meant that an element is used to fixate or arrest the size and/or shape of the gap, so that the gap remains constant. This includes embodiments where the gap itself is filled, such as with a bolt, a wedge or other elements.

In some embodiments, actuating the arrestor element can include moving an elongated element, which is arranged in a bore, in an axial direction.

Typically, the arrestor element can be a threaded bolt that can be rotated such as with a remotely operated vehicle (ROV). In other embodiments, the arrestor element may for instance be a bolt without threads, but instead having other means for locking the bolt in place after it has been actuated (i.e. after it has been moved in its axial direction).

In some embodiments, actuating the arrestor element can include rotating at least two elongated elements, wherein the axial directions of which have a mutual angle.

By having a mutual angle it is meant that the two elongated elements, typically threaded bolts, are not arranged in parallel.

The termination hub can in some embodiments be a spool hub, and the termination arrestor interface can be connected to a load element that is connected to the spool with a spool interface at an axial distance from the termination hub.

In this manner, a bending force from the spool, typically a tie-in spool, can be transferred to the termination part and thus to the porch part at a position on the spool that is some distance from the connector and the termination hub.

According to a second aspect of the present invention, there is provided a subsea fluid connection system that comprises a porch part having a porch hub interface configured to receive a porch hub;
a termination part having a termination hub interface configured to receive a termination hub, wherein the termination part is configured to land on the porch part;
an alignment system configured to align the porch hub and the termination hub during movement of the termination hub towards the porch hub in a landed state;
a connector configured to connect the porch hub and the termination hub; wherein the subsea tie-in system further comprises a moment arrestor arrangement that comprises
a termination arrestor interface, which is part of the termination part;
a porch arrestor interface, which is part of the porch part;
an arrestor element configured to arrest the termination arrestor interface with respect to the porch arrestor interface, when the connector, the porch hub and the termination hub are in a connected state.

The porch hub interface is configured to receive and connect to a pipe hub that shall be connected to the termination hub, such as a tie-in spool hub. Correspondingly, the termination hub interface is configured to receive and connect to the hub of another pipe, for instance a tie-in spool.

A landed state means that the termination part has landed on the porch part.

The connector is a component configured to connect the two facing hubs, once they are within the capturing envelope of the connector. This connection will take place after landing of the termination part on the porch part, and after movement of the termination hub towards the porch hub.

Advantageously, the alignment system can be configured to be out of engagement when the connection between the porch hub and the termination hub has been made.

According to the invention, the system further comprises an arrestor gap between the termination arrestor interface and the porch arrestor interface, when the termination part and the porch part are in a landed and connected state.

Moreover, the arrestor element is configured to close the arrestor gap between the termination arrestor interface and the porch arrestor interface.

By closing the arrestor gap is meant that the arrestor element bridges over the gap, or fills the gap, so that it fixates the opposite faces of the gap with respect to each other. As will become apparent further below, this can performed with various embodiments.

In some embodiments the arrestor element comprises an elongated element, such as a bolt or screw, arranged in a bore.

Typically, the arrestor element is a threaded bolt that can be rotated, for instance with a remotely operated vehicle (ROV). In other embodiments, the arrestor element may for instance be a bolt without threads, but instead having other means for locking the bolt in place after it has been actuated (i.e. after it has been moved in the axial direction.

There may also be further embodiments, where the arrestor element is not in the form of elongated and axially moving elements, but instead for instance has the shape of a wedge. Such a wedge or wedges can be moved into the arrestor gap to fixate the opposite faces of the gap.

The arrestor element can in some embodiments comprise two elongated elements with a mutual angle between their axial directions.

By having a mutual angle, it is meant that the two elongated elements, typically threaded bolts, are not arranged in parallel.

The porch arrestor interface can advantageously comprise two contact faces configured to abut the two elongated elements.

In some embodiments, the moment arrestor arrangement can comprise two pairs of termination arrestor interface and porch arrestor interface. The moment arrestor arrangement can even comprise three or more pairs of arrestor interface and porch arrestor interface.

The termination part can further comprises a load element at an axial distance from the termination hub interface. The load element can comprise a spool interface that is configured to connect to a spool to which the termination hub is connected. The termination arrestor interface can be connected to the load element.

The subsea fluid connection system can also have a connection structure that extends along at least a part of said axial distance, which constitutes at least a part of a connection between the spool interface and the termination hub interface.

In such embodiments, the load element, typically in form of a load plate, can be connected to forward parts of the termination part both through the spool itself, as well as through the connection structure.

The said axial distance can typically be at least corresponding to the inner diameter of the spool.

In some advantageous embodiments of the invention discussed above, there will be at least two pairs of termination arrestor interfaces and porch arrestor interfaces.

In some advantageous embodiments of the invention discussed above, the termination arrestor interfaces and porch arrestor interfaces can be arranged below the center axis of the termination hub, when in a landed and connected state.

An advantageous result of the present invention is that incoming loads from for instance a tie-in spool is directed away from the connector and into the supporting base structure.

This will further have additional advantageous effects. For instance, the size of an expansion spool can be reduced since the connection system will have a high moment capacity during operation. Thus, the spool structural capacity can be the dimensioning parameter and not the connection system operational moment capacity.

The invention can imply an increased weight of the termination part and a reduced weight of the porch part. The porch part is normally attached to a subsea steel structure while the termination part is attached to a spool. As such, the lifting weights of a subsea structure will be reduced as the porch part weight is reduced. This will normally be the case even though protruding steel beams below the porch part may be required.

DETAILED DESCRIPTION OF THE INVENTION

While various features of the invention have been discussed in general terms above, a more detailed and non-limiting example of embodiment will be presented in the following with reference to the drawings, in which:

FIG. 3b is a perspective view of a termination part of the connection system shown in FIG. 3a;

Figures 1, 2:
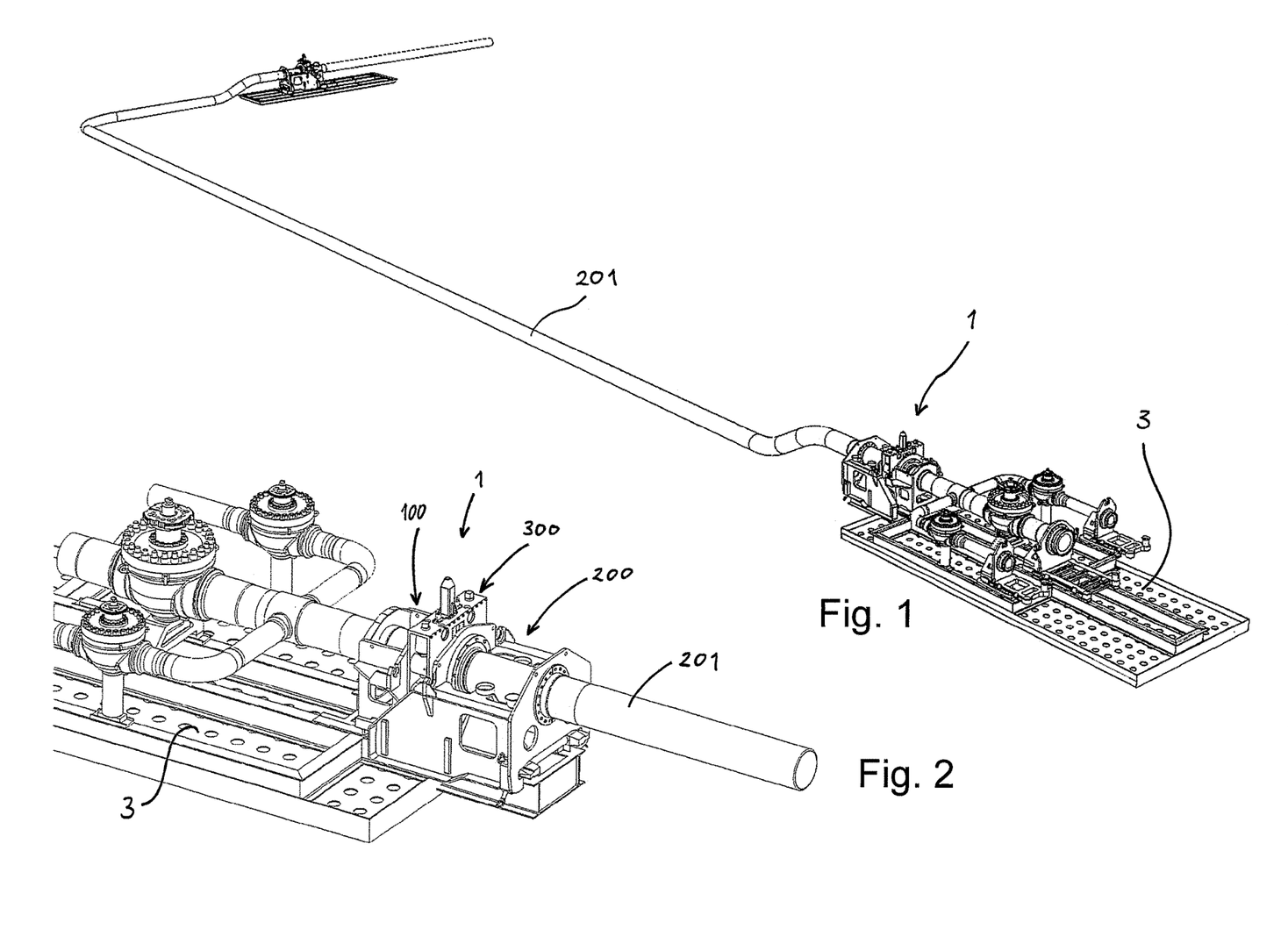
FIG. 1 shows a typical tie-in spool arranged on the seabed, connected to a subsea steel structure.
FIG. 2 shows a portion of the subsea steel structure and a subsea fluid connection system according to the invention attached to the subsea steel structure.

FIG. 1 shows a typical application of the subsea fluid connection system 1 according to the present invention. A tie-in spool 201 has been lowered from the surface and has been connected to a subsea steel structure 3. The tie-in spool 201 will experience changes in dimensions, typically due to temperature variations and pressures inside the tie-in spool 201 and/or inside a pipeline transferred via a typical PLET connection (pipeline end termination). As a result of such changes in dimensions, bending loads will be exerted on the connection point, where the tie-in spool 201 connects to the subsea steel structure 3.

FIG. 2 shows the end of the tie-in spool 201 when connected to the subsea steel structure 3 in better detail. While FIG. 1 and FIG. 2 show a typical application of the subsea fluid connection system according to the invention, the system itself will be discussed with reference to the succeeding figures.

Figure 3A:
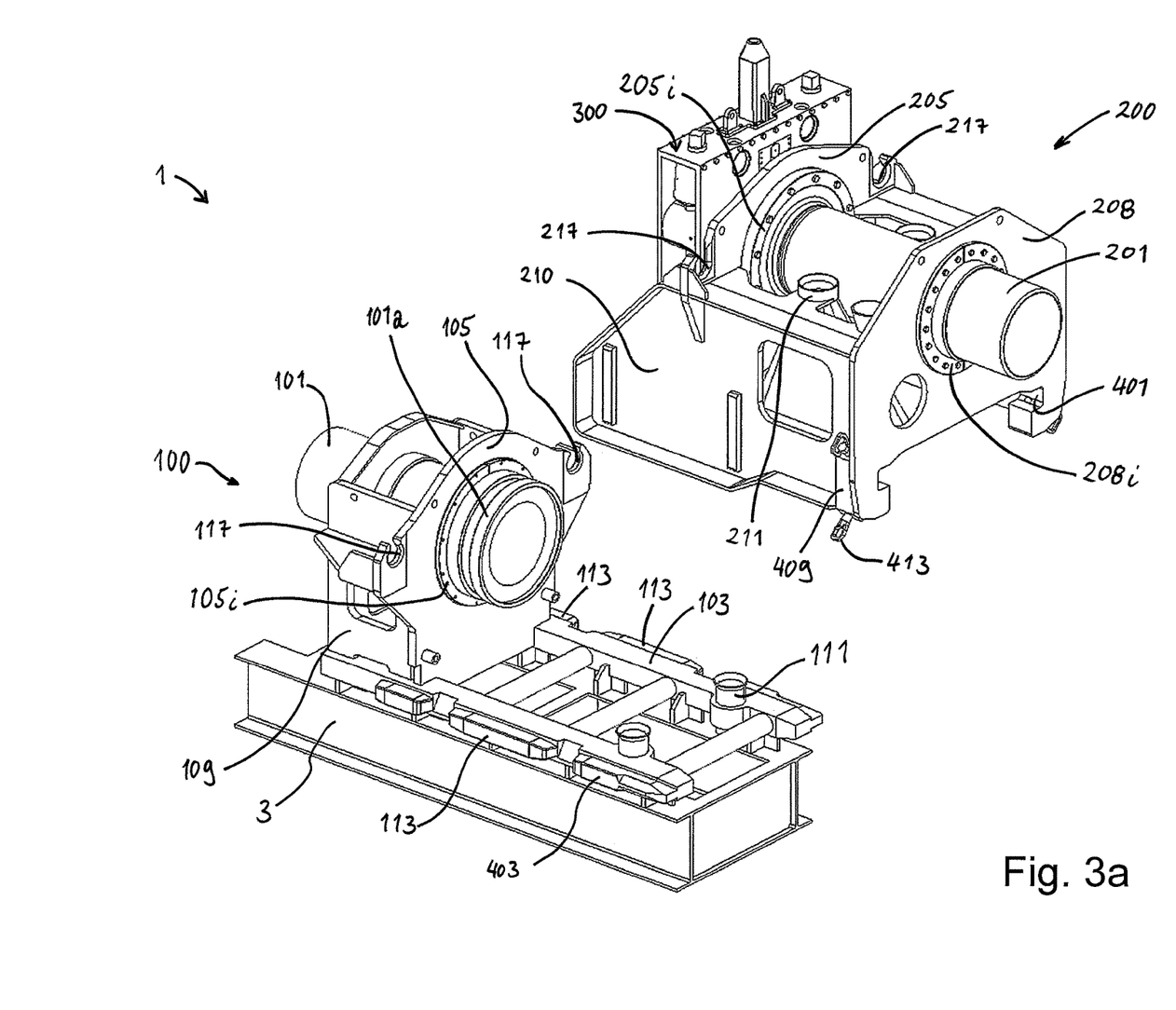
FIG. 3a is a perspective view of a subsea fluid connection system according to the invention, shown in a non-landed state.

FIG. 3a depicts an embodiment of the subsea fluid connection system 1 according to the invention, with a perspective view. The connection system 1 comprises three main parts, a porch part 100, a termination part 200 and a connector 300. The porch part 100 is typically a stationary part arranged at an end of a subsea pipeline or in connection with a subsea facility, such as a subsea processing facility or a manifold. A small length of such a pipeline 101 or subsea structure main header is indicated.

The porch part 100 comprises a base structure 103. Vertically up from the base structure 103 extends a connection plate 105. The connection plate has a porch hub interface 105i. The porch hub interface 105i is configured to receive the end hub of a pipeline or a similar component. In the shown embodiment, the end portion of the pipeline 101 or subsea structure main header is connected to the connection plate 105 with the porch hub interface 105i, inter alia. Advantageously, a swivel is arranged so that the pipeline 101 or subsea structure main header is free to rotate with respect to the connection plate 105. A pair of support plates 109 contribute in securing the connection plate 105 to the base structure 103.

The termination part 200 is shown on the upper right-hand side of FIG. 3a. It is typically attached to the end of a tie-in spool 201, of which only the end portion is shown in FIG. 3a. The termination part 200 has a vertical main plate 205, to which the end of the tie-in spool 201 is connected by means of a termination hub interface 205i.

The termination hub interface 205i can be configured to receive a tie-in spool, as shown in the present embodiment. In some embodiments the termination hub interface 205i is configured such that the tie-in spool 201 can rotate about its longitudinal axis at the position of the termination part 200.

At the end of the pipeline 101 there is a porch hub 101a. Correspondingly, at the end of the tie-in spool 201, there is a termination hub 201a. The termination hub 201a is not visible in FIG. 3a, as it is arranged within a connector 300 (but is visible in FIG. 3b).

The connector 300 is connected to the termination part 200. The connector 300 is a known device in the art, which is used for connection of the two facing hubs of the ends of the pipeline 101 and the tie-in spool 201. Once the two facing hubs are arranged within the capture envelope of the connector 300, actuation of the connector will force the two hubs into a connected state. In such a position, the two hubs are aligned and sealed, so that fluid may flow through the connection without leakage to the environment. Such fluid may typically include hydrocarbons from a subsea well.

In the situation shown in FIG. 3a, the termination part 200 is about to be landed onto the base structure 103 of the porch part 100. In this situation, the termination part 200, being on the end of a tie-in spool 201, may be lifted with the crane of an offshore vessel. In order to land correctly onto the base structure 103, the position and orientation alignment of the termination part 200 can typically be performed by entering a guide element (not shown) onto a guidepost extending upwards from the base structure 103 (not shown). Guidepost retainers 111 configured to retain guideposts are shown attached to the base structure 103. Guide elements 211 configured to engage with the guideposts are sown in the termination part 200. The entering onto the guidepost can be done with assistance from a WROV (work type remotely operated vehicle) or via guidewires.

Still referring to FIG. 3a, protruding laterally out from the base structure 103 there are arranged guiding members 113. The guiding members 113 are part of an alignment system, which is configured to engage with guide slots (not shown) arranged on the termination part 200.

Figure 3B:
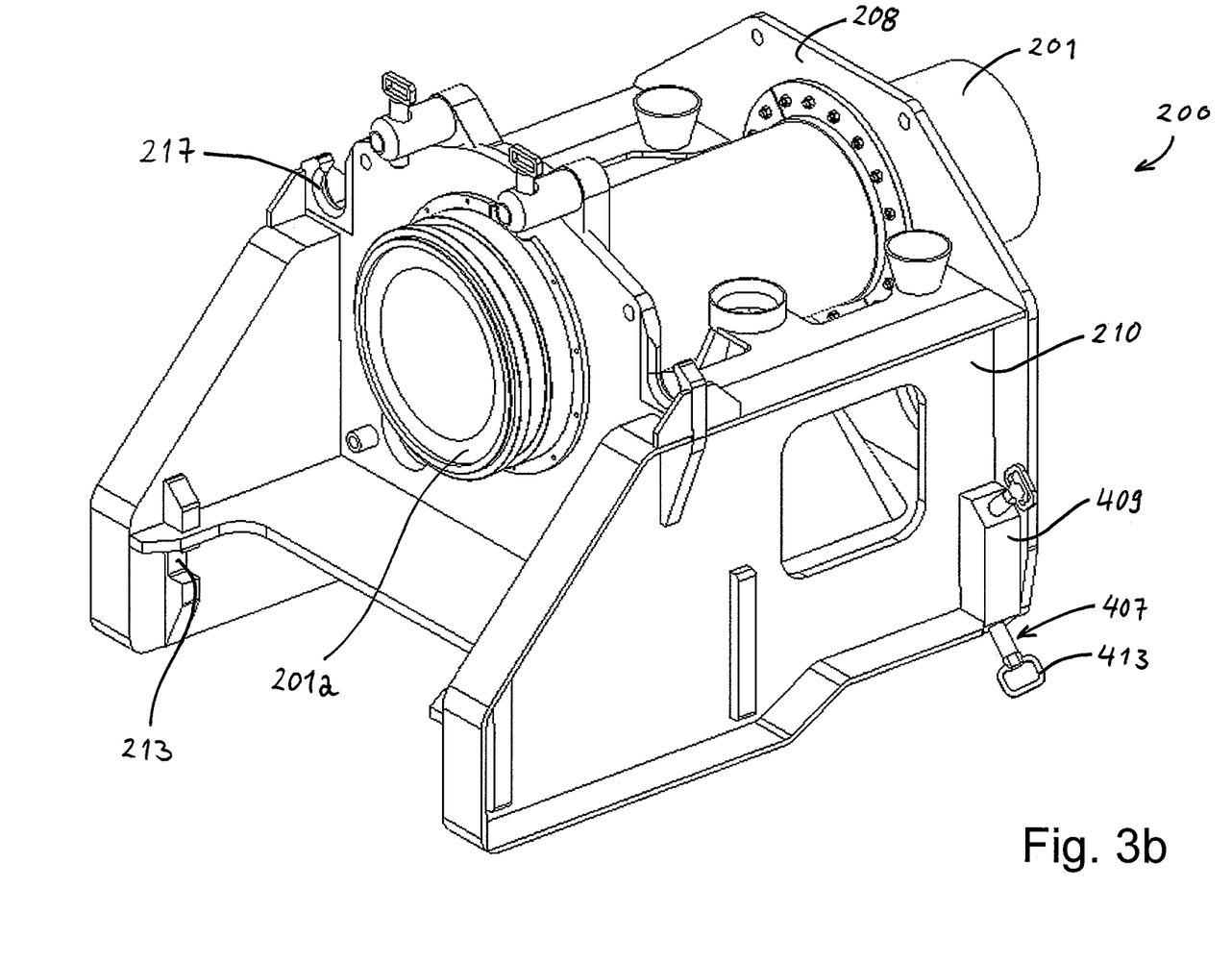

FIG. 3b shows the termination part 200 from another angle and without the connector 300. In this view, the termination hub 201a is visible. A guiding member 213 of the termination part 200 is also visible in this view.

Figure 4:
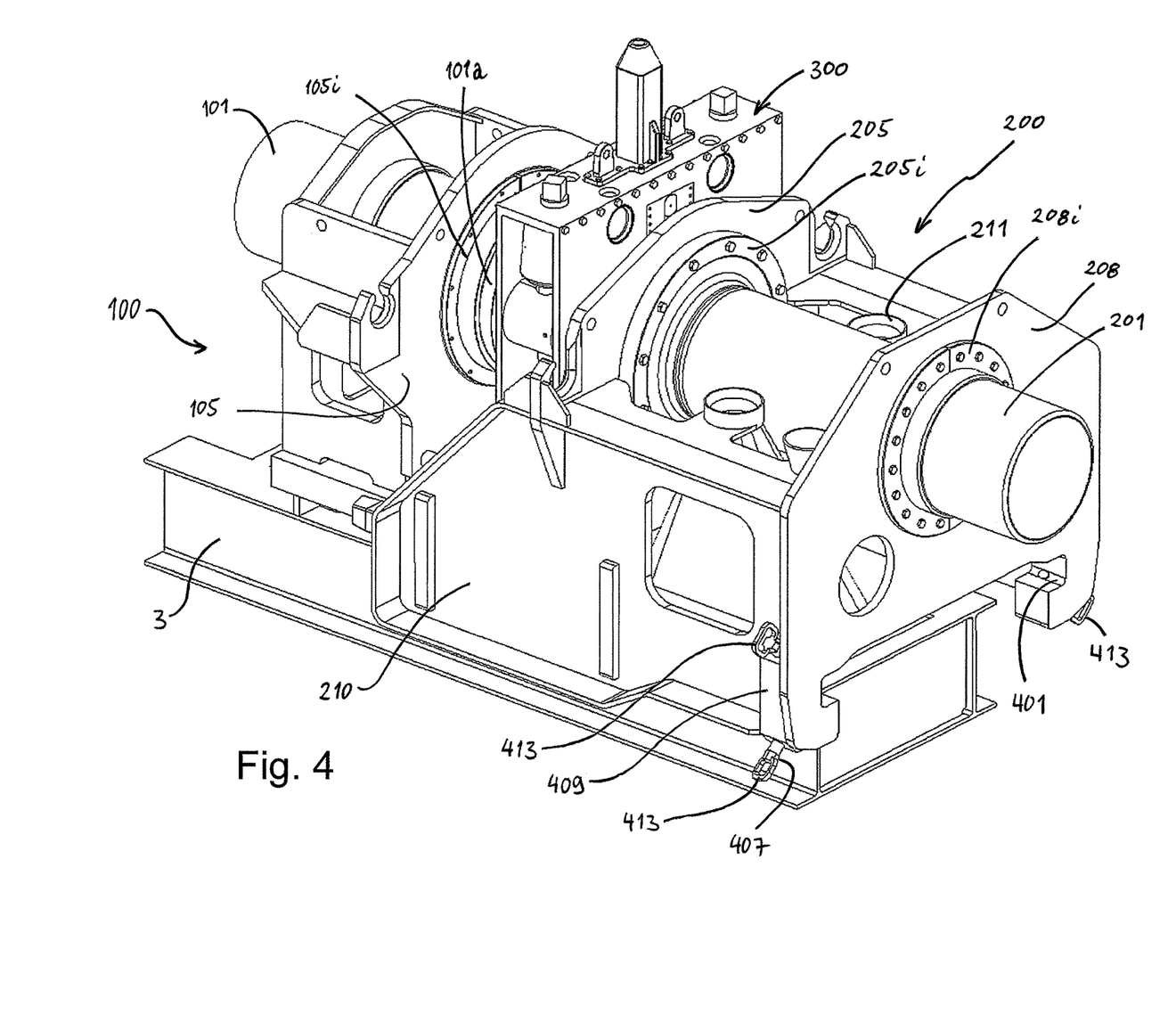
FIG. 4 is a perspective view of the system shown in FIG. 3a, shown in a landed but not yet aligned state.
Figure 5:
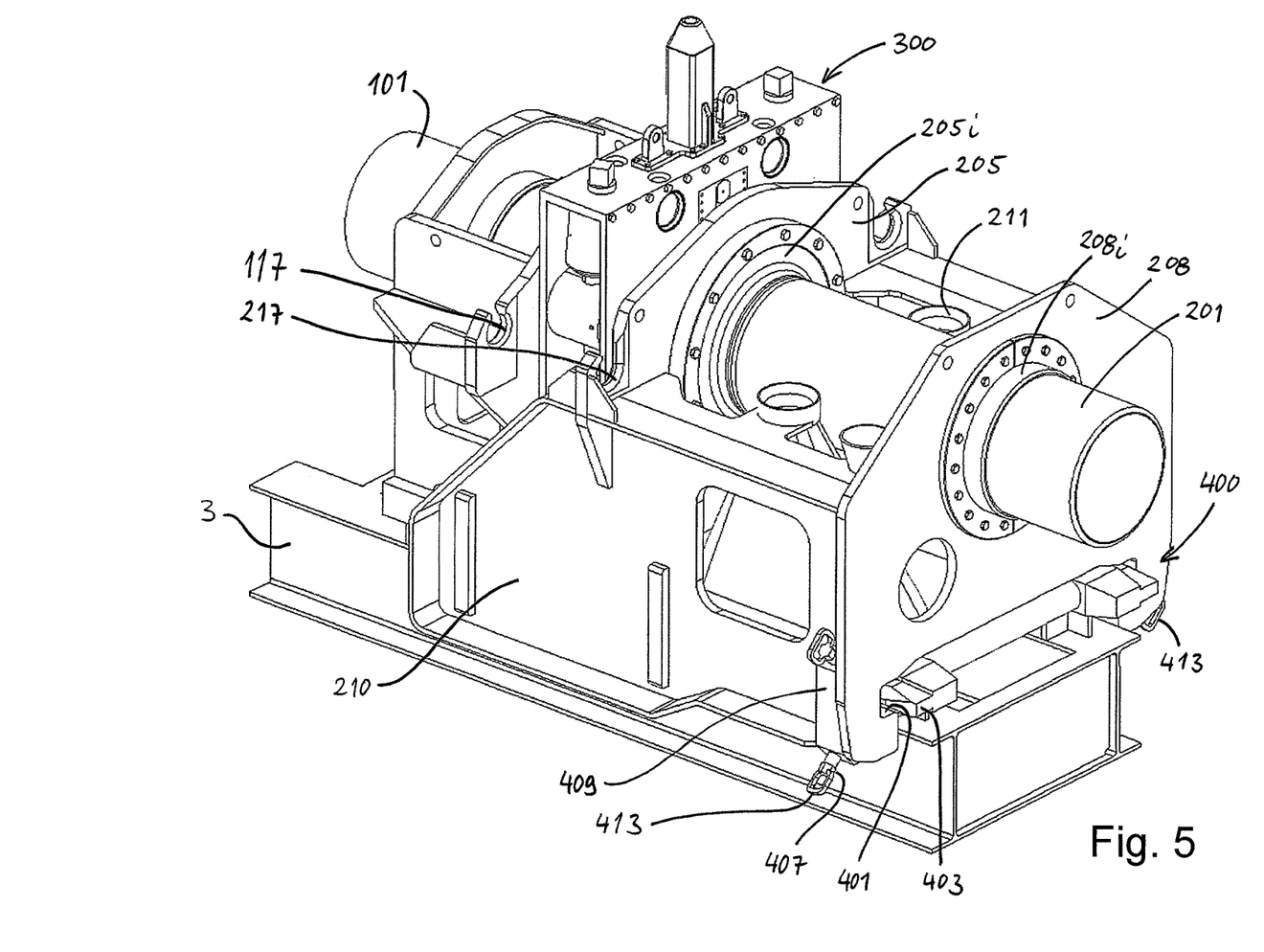
FIG. 5 is a perspective view corresponding to FIG. 4, depicting the system in a landed and aligned state.

FIG. 4 depicts a situation where the termination part 200 has landed on the porch part 100. FIG. 5 shows the same parts as FIG. 4, however after pulling the termination part 200 horizontally towards the porch part 100.

During the horizontal movement of the termination part 200 on the porch part 100, the connector 300 is moved towards the porch hub 101a (FIG. 3a). During this movement, the guiding members 113 engages with the termination part 200 to align the porch hub 101a and the termination hub 201a. When the porch hub 101a is within the capture envelope of the connector 300, the connector is actuated, thus connecting the facing hubs.

Advantageously, in this connected situation (FIG. 5), the engagement between the guiding members 113 of the porch part and the corresponding guiding elements of the termination part 200 has ended. I.e. there is no aligning engagement at the end of the horizontal movement. For such an embodiment, in this situation the connector 300 transfers the forces between the tie-in spool 201 and the porch hub 101a.

To provide the horizontal movement, the operator may use stroke tools (not shown) engaged with stroke tool interfaces 117, 217 arranged on the porch part 100 and the termination part 200.

In the shown embodiment, connected to the tie-in spool 201, at an axial distance from the termination hub 201a, there is a load element. In the shown embodiment, the load element is in the form of a load plate 208. In the shown embodiment (see e.g. FIG. 3a), the tie-in spool 201 is connected to the load element 208 by means of a spool interface 208i. The tie-in spool 201 is free to rotate with respect to the load element 208.

The load element, i.e. the load plate 208 in the shown embodiment, connects to the vertical main plate 205 through, inter alia, a pair of axially extending attachment plates 210. Thus, in this embodiment the termination part 200 provides a rigid connection structure between the termination hub 201a (via the vertical main plate 205) and the load element (load plate 208). Both the connection structure 210 and the tie-in spool 201 contribute in connecting the load plate 208 to the termination hub.

The axial distance between the hub interface, where the porch hub 101a and the termination hub 201a engage, and the load element (load plate 208) can advantageously be more than the inner diameter of the tie-in spool, more advantageously 1.5 times the inner diameter.

Figures 6, 7:
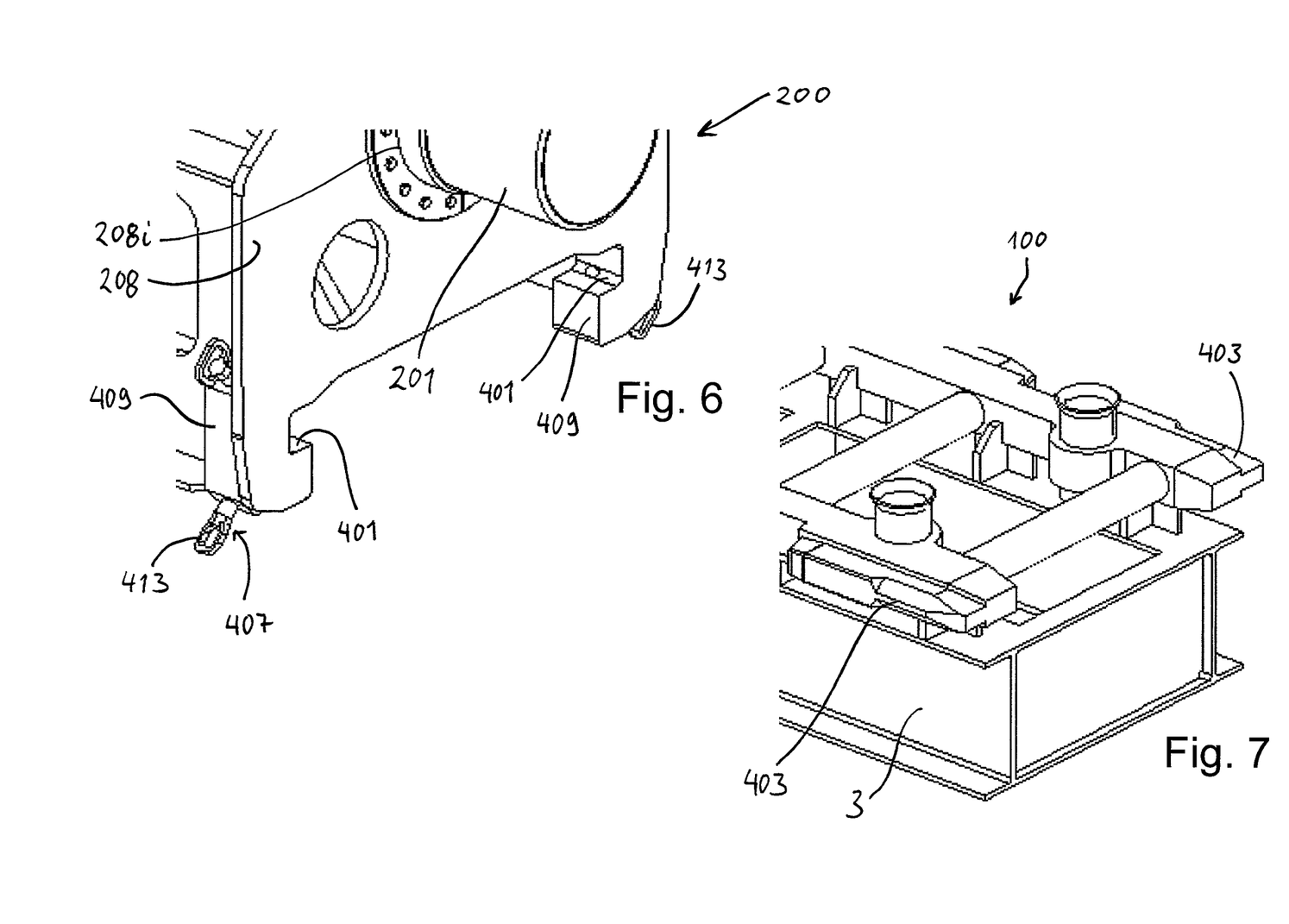
FIG. 6 is an enlarged perspective view of a portion of the termination part.
FIG. 7 is an enlarged perspective view of a portion of the porch part.

FIG. 6 shows an enlarged portion of the termination part 200 shown in FIG. 3a, while FIG. 7 shows an enlarged portion of the porch part 100. The termination part 200 comprises two termination arrestor interfaces 401, which in the shown embodiment is in the form of recesses in the load plate 208. The porch part 100 comprises two porch arrestor interfaces 403. The termination arrestor interfaces 401 are configured to engage with the two porch arrestor interfaces 403. In the embodiment shown in FIG. 7, the two porch arrestor interfaces 403 are in the form of elongated protrusions that are configured to be received in the recesses 401 in the load plate 208.

The termination arrestor interfaces 401 and the porch arrestor interfaces 403 are parts of a moment arrestor arrangement 400. The moment arrestor arrangement 400 is configured to arrest the termination part 200 with respect to the porch part 100 when the facing hubs have been connected with the connector 300, i.e. when the connector 300, the porch hub 101a and the termination hub 201a are in a connected state.

It is again referred to FIG. 4 and FIG. 5, which show the porch part 100 and the termination part 200 before and after, respectively, the horizontal pull-in movement. The termination arrestor interface 401, which is a recess in this embodiment, receives the porch arrestor interface 403 during the said horizontal pull-in movement. As discussed above, after the horizontal movement, the connector 300 is actuated to connect the facing hubs, namely the termination hub 201a and the porch hub 101a. When the connector 300 has made this connection, there is no contact between the termination arrestor interface 401 and the porch arrestor interface 403.

Figure 8:
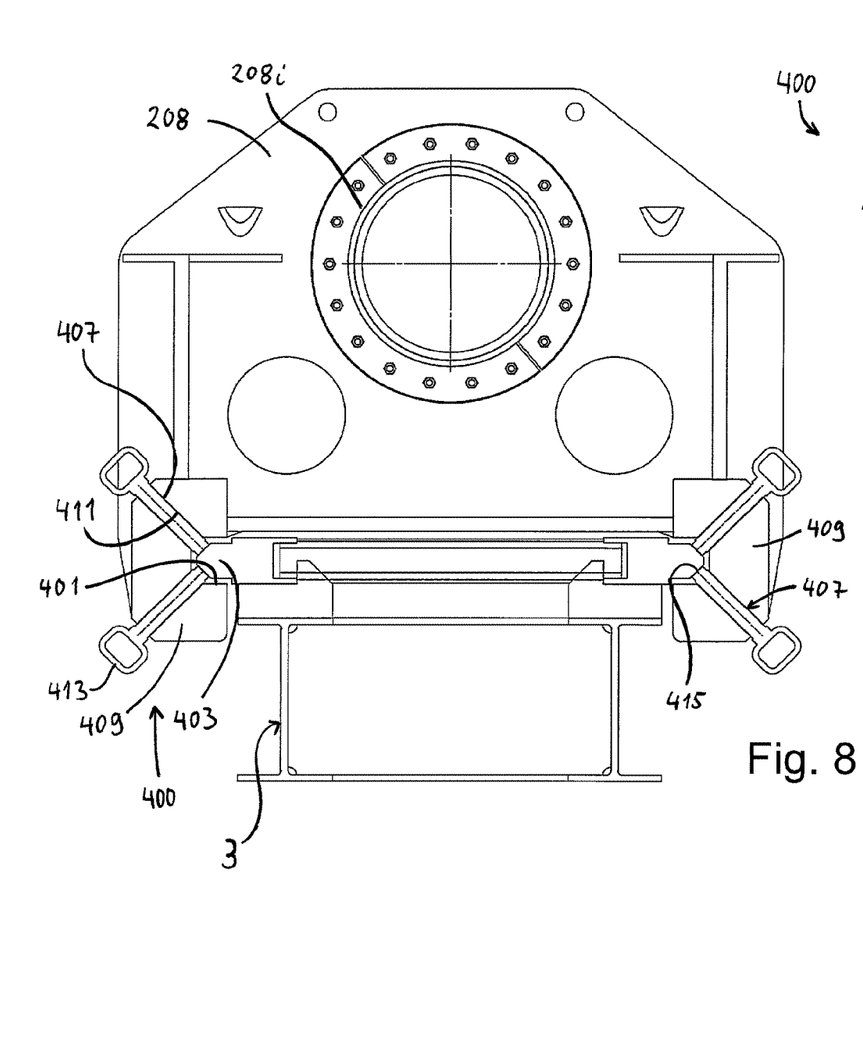
FIG. 8 is an axial cross-section view of the subsea fluid connection system when in an arrested state.
Figure 9:
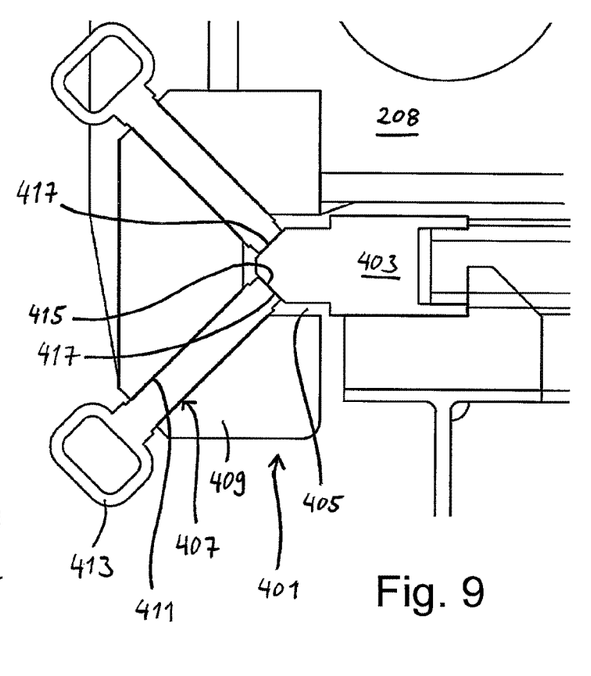
FIG. 9 is an enlarged portion of the view shown in FIG. 8, depicting parts of the moment arrestor arrangement in better detail.

Reference is now made to FIG. 8 and FIG. 9, which show front cross-section views, along the axial direction. These images illustrate the situation shown in FIG. 5, where the connector 300 has connected the two facing hubs. As appears from FIG. 8 and FIG. 9, the termination arrestor interface 401 and the porch arrestor interface 403 are not abutting each other. Rather there is an arrestor gap 405 present, as indicated in FIG. 9.

Arranged in association with the termination arrestor interface 401, there are arranged two arrestor elements 407. The arrestor elements 407 shown in this embodiment are in the form of threaded, rotating bolts.

The termination arrestor interface 401 has a termination arrestor body 409. In the termination arrestor body 409 there are two threaded bores 411, in which the bolts 407 are arranged.

The bolt 407 comprises an ROV interface 413, by means of which the operator can rotate the bolt 407 by using an ROV (remotely operated vehicle). As the skilled reader now will appreciate, the operator can arrest the termination arrestor interface 401 with respect to the porch arrestor interface 403 by moving the arrestor elements 407 (bolts) into engagement with the porch arrestor interface 403.

The bolts 407 have an abutment face 415 at their forward end. When the bolts 407 are rotated, the abutment faces 415 come into abutment with contact faces 417 of the porch arrestor interface 403. Thus, the arrestor elements 407 (bolts) bridge the arrestor gap 405 (FIG. 9).

In the embodiment shown in FIG. 6 to FIG. 9, the moment arrestor arrangement 400 comprises two termination arrestor interfaces 401 and two porch arrestor interfaces 403. Each termination arrestor interface 401 comprises two arrestor elements 407 (bolts).

Furthermore, in the shown embodiment, the two bores 411 of the termination arrestor interface 401 are configured with a mutual angle, i.e. they are not parallel. In the shown embodiment the two bores 411, and thus also the two bolts 407, have a mutual angle of about 90 degrees. As can be appreciated from FIG. 9, the two contact faces 417 of the porch arrestor interface 403 face the abutment faces 415 of the two bolts 407. Consequently, the two contact faces 417 also have a mutual angle of 90 degrees.

In other embodiments the mutual angle can be different. However, it is considered as an advantage that the two bolts 407 of the same termination arrestor interface 401 are not in parallel.

While the shown embodiment includes threaded bolts that can be rotated into abutment with the porch arrestor interface 403, it shall be clear that other components can be used to arrest the load element 208 with respect to the porch part 100. Moreover, for embodiments including bolts, the bolts may be without threads. Such bolts may be fixed in their arresting position by other means.

In the embodiment discussed above, the termination part 200 comprises a load element 208, which connects to the tie-in spool 201 via the spool interface 208i. In some embodiments, however, there may not be a spool interface 208i. Rather, the termination arrestor interface 401 can be fixed to the rigid connection structure 210 (in the form of attachment plates 210 in the shown embodiment).

Figures 10, 12:
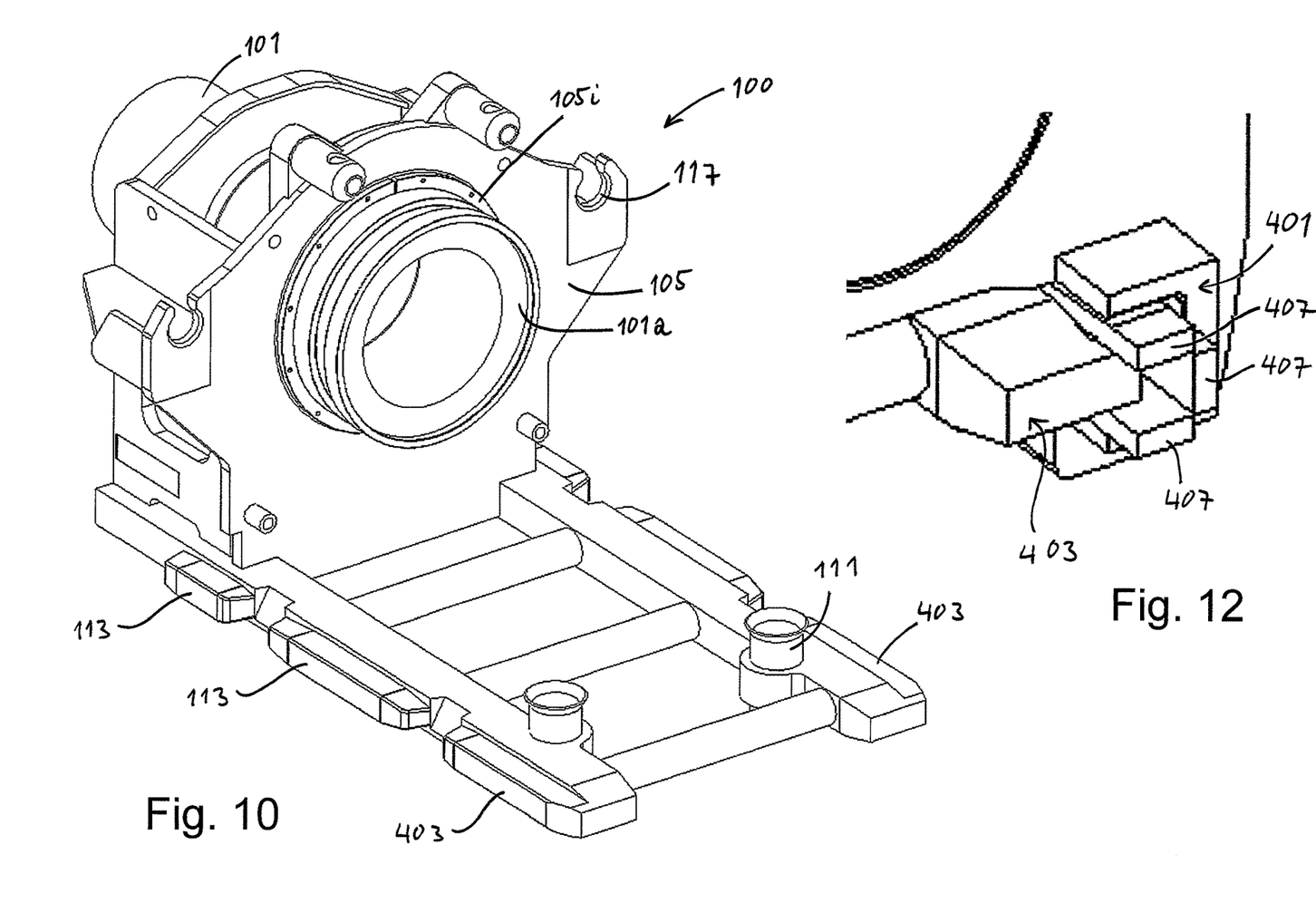
FIG. 10 is a perspective view of a porch part according to an alternative embodiment of the invention.
FIG. 12 is an enlarged portion of FIG. 11, showing arrestor elements in better detail.
Figure 11:
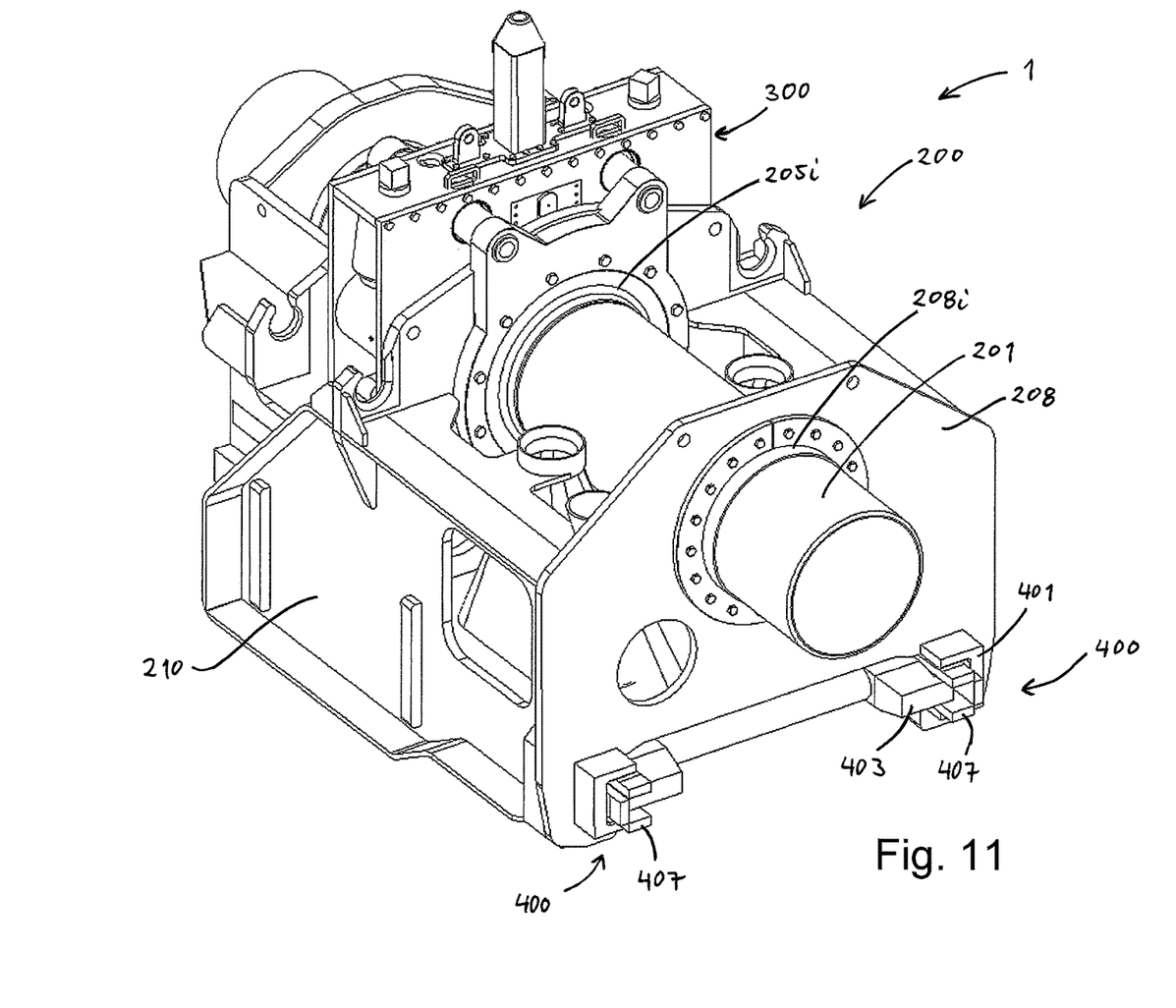
FIG. 11 is a perspective view of the porch part shown in FIG. 10 and a termination part in an arrested state.

FIG. 10, FIG. 11, and FIG. 12 depict an alternative embodiment of the present invention. In this embodiment, the arrestor elements 407 are in the form of wedges. As with the embodiment discussed above, an arrestor gap 405 (not indicated in FIG. 10 to FIG. 12) is present between the termination arrestor interface 401 and the porch arrestor interface 403. As shown in FIG. 11 and also in FIG. 12, which is an enlarged portion of FIG. 11, wedges 407 are introduced in the arrestor gaps 405. This will establish a fixed connection between the termination arrestor interface 401 and the porch arrestor interface 403. The wedges 407 can typically be arranged by means of an ROV.

In the shown embodiment, there are arranged three wedges 407 between two facing termination arrestor interface 401 and porch arrestor interface 403. In an alternative embodiment that also includes wedges 407, however, one could imagine using contact faces with the inclination corresponding to the contact faces 417 shown in FIG. 9. It would then suffice with two wedges 407 for each set of termination arrestor interface 401 and porch arrestor interface 403.

The invention enables reduced loads being transferred across the connector 300 during operation. This will have further beneficial impact on equipment installed inboard of the connection, such as T-pieces and valves.

The invention claimed is:

1. A method for connecting a termination hub to a porch hub at a subsea location by using a subsea fluid connection system, wherein the subsea fluid connection system comprises a porch part with the porch hub, a termination part with the termination hub, and a connector, the method comprising:
   a) landing the termination part on the porch part at the subsea location;
   b) moving the termination hub of the termination part into alignment with the porch hub of the porch part;
   c) with the connector, connecting the termination hub to the porch hub; and
   d) after step c), actuating a moment arrestor arrangement, thereby further arresting the termination part to the porch part.

2. The method according to claim 1, wherein:
the moment arrestor arrangement comprises a termination arrestor interface, which is a part of the termination part, and a porch arrestor interface, which is a part of the porch part; and
step d) comprises i) closing an arrestor gap between the termination arrestor interface and the porch arrestor interface by actuating an arrestor element.

3. The method according to claim 2, wherein actuating the arrestor element includes moving an elongated element arranged in a bore in an axial direction.

4. The method according to claim 3, wherein actuating the arrestor element includes rotating at least two elongated elements, wherein the axial directions of which have a mutual angle.

5. The method according to claim 2, wherein:
the termination hub is a spool hub; and
the termination arrestor interface is connected to a load element that is connected to the spool with a spool interface at an axial distance from the termination hub.

6. A subsea fluid connection system comprising:
a porch part having a porch hub interface configured to receive a porch hub;
a termination part having a termination hub interface configured to receive a termination hub;
wherein the termination part is configured to land on the porch part;
an alignment system configured to align the porch hub and the termination hub during movement of the termination hub towards the porch hub in a landed state;
a connector configured to connect the porch hub and the termination hub;
wherein the subsea fluid connection system comprises a moment arrestor arrangement, the moment arrestor arrangement comprising:
   a termination arrestor interface, which is part of the termination part;
   a porch arrestor interface, which is part of the porch part; and
   an arrestor element configured to arrest the termination arrestor interface with respect to the porch arrestor interface, when the connector, the porch hub and the termination hub are in a connected state;
an arrestor gap between the termination arrestor interface and the porch arrestor interface, when the termination part and the porch part are in a landed and connected state; and
wherein the arrestor element is configured to close the arrestor gap between the termination arrestor interface and the porch arrestor interface.

7. The subsea fluid connection system according to claim 6, wherein the arrestor element comprises an elongated element arranged in a bore.

8. The subsea fluid connection system according to claim 6, wherein the arrestor element comprises two elongated elements with a mutual angle between their axial directions.

9. The subsea fluid connection system according to claim 8, wherein the porch arrestor interface comprises two contact faces configured to abut the two elongated elements.

10. The subsea fluid connection system according to claim 6, wherein the moment arrestor arrangement comprises two pairs of termination arrestor interface and porch arrestor interface.

11. The subsea fluid connection system according to claim 6, wherein:
the termination part further comprises a load element at an axial distance from the termination hub interface;
the load element comprises a spool interface that is configured to connect to a spool to which the termination hub is connected; and
the termination arrestor interface is connected to the load element.

12. The subsea fluid connection system according to claim 11, comprising a connection structure extending along at least a part of said axial distance, which constitutes at least a part of a connection between the spool interface and the termination hub interface.

* * * * *